United States Patent [19]

Kiser

[11] Patent Number: 5,586,932

[45] Date of Patent: Dec. 24, 1996

[54] ENVIRONMENTAL CONTROL AIRHOUSE WITH VARIABLE OUTPUT

[75] Inventor: Thomas E. Kiser, Fremont, Ohio

[73] Assignee: Professional Supply, Inc., Fremont, Ohio

[21] Appl. No.: 362,128

[22] Filed: Dec. 22, 1994

Related U.S. Application Data

[63] Continuation-in-part of Ser. No. 148,833, Nov. 5, 1993, Pat. No. 5,376,045.

[51] Int. Cl.$^6$ ....................................................... F24F 7/08
[52] U.S. Cl. ............................ 454/229; 126/110 AA; 454/236; 454/300; 454/311; 454/312
[58] Field of Search ........................... 126/103, 110 AA, 126/116 R; 454/228, 229, 234, 235, 236, 265, 269, 324, 334, 338, 300, 311, 312

[56] References Cited

U.S. PATENT DOCUMENTS

| Re. 28,946 | 8/1976 | Martz et al. . | |
|---|---|---|---|
| Re. 32,461 | 7/1987 | Di Peri | 62/314 |
| 1,016,336 | 2/1912 | Kuhns . | |
| 1,903,143 | 3/1933 | Shurtleff . | |
| 2,282,210 | 5/1942 | Plum . | |
| 2,310,121 | 2/1943 | Scherer . | |
| 2,372,830 | 4/1945 | Honerkamp et al. | 454/312 X |
| 2,636,371 | 4/1953 | Stephens . | |
| 2,898,836 | 8/1959 | Lockheed | 454/229 |
| 3,053,164 | 9/1962 | Lyttle et al. | 454/300 |
| 3,171,401 | 3/1965 | McDuffee . | |
| 3,212,424 | 10/1965 | Davis . | |
| 3,246,643 | 4/1966 | Stark et al. . | |
| 3,402,654 | 9/1968 | Berst . | |
| 3,404,618 | 10/1968 | Jacobs | 454/236 |
| 3,748,997 | 7/1973 | Dean, Jr. et al. | 454/236 X |
| 3,799,513 | 3/1974 | Winton . | |
| 3,859,812 | 1/1975 | Pavlak . | |
| 3,960,527 | 6/1976 | Goettl | 454/236 X |
| 4,069,030 | 1/1978 | Nickell et al. . | |
| 4,257,318 | 3/1981 | Johannsen . | |
| 4,407,185 | 10/1983 | Haines et al. . | |
| 4,489,881 | 12/1984 | Dean et al. . | |
| 4,570,532 | 2/1986 | LaBelle | 454/234 |
| 4,581,988 | 4/1986 | Mattei . | |
| 4,754,196 | 7/1988 | Davis | 454/236 X |
| 4,828,171 | 5/1989 | Akin, Jr. et al. . | |
| 4,850,264 | 7/1989 | Kiser . | |
| 4,905,578 | 3/1990 | Curtis et al. . | |
| 4,960,041 | 10/1990 | Kiser | 454/229 X |
| 5,146,977 | 9/1992 | Kiser . | |
| 5,289,696 | 3/1994 | Kiser et al. . | |
| 5,290,188 | 3/1994 | Kiser et al. . | |
| 5,290,200 | 3/1994 | Kiser . | |

*Primary Examiner*—Harold Joyce
*Attorney, Agent, or Firm*—Harness, Dickey & Pierce, P.L.C.

[57] ABSTRACT

An airhouse for supplying conditioned air to the interior area of an enclosed building. The airhouse incorporates one or more blowers having variable speed controllers enabling them to be operated at variable volumetric flow rates. The airhouse housing includes variable area dampers for controlling the inlet of outside or building return air. A dedicated controller is provided for adjusting the inlet areas of the two inlet pathways to provide a constant flow velocity through a direct fire burner through a range of blower volumetric output settings. In addition the units may include variable area diffuser units which tend to maintain constant discharge velocity pressure at various blower volumetric flow rate settings. In addition various control and operating strategies are provided for the individual airhouse units and a distributed array of such units in a large building structure controlled by a central computer.

20 Claims, 6 Drawing Sheets

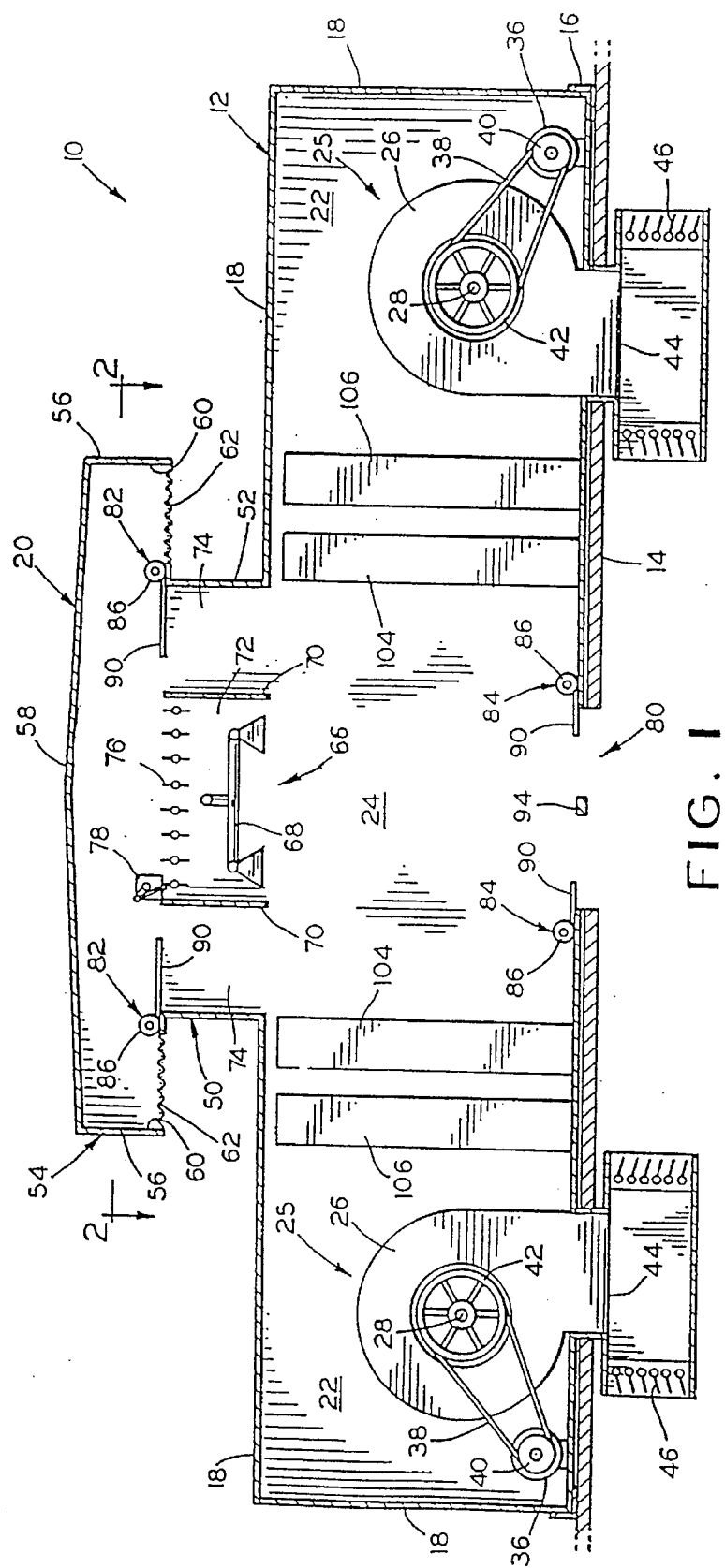
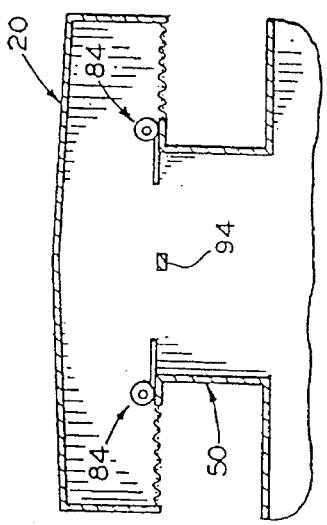
FIG. 1
FIG. 3

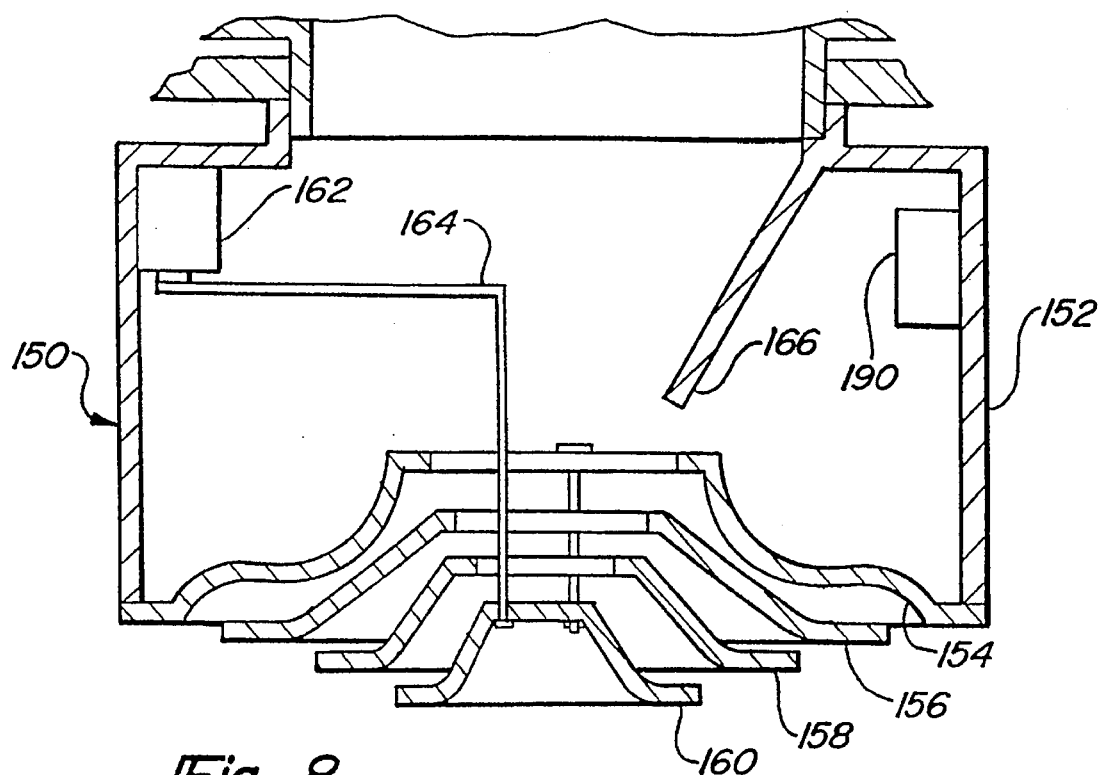
_Fig-8_
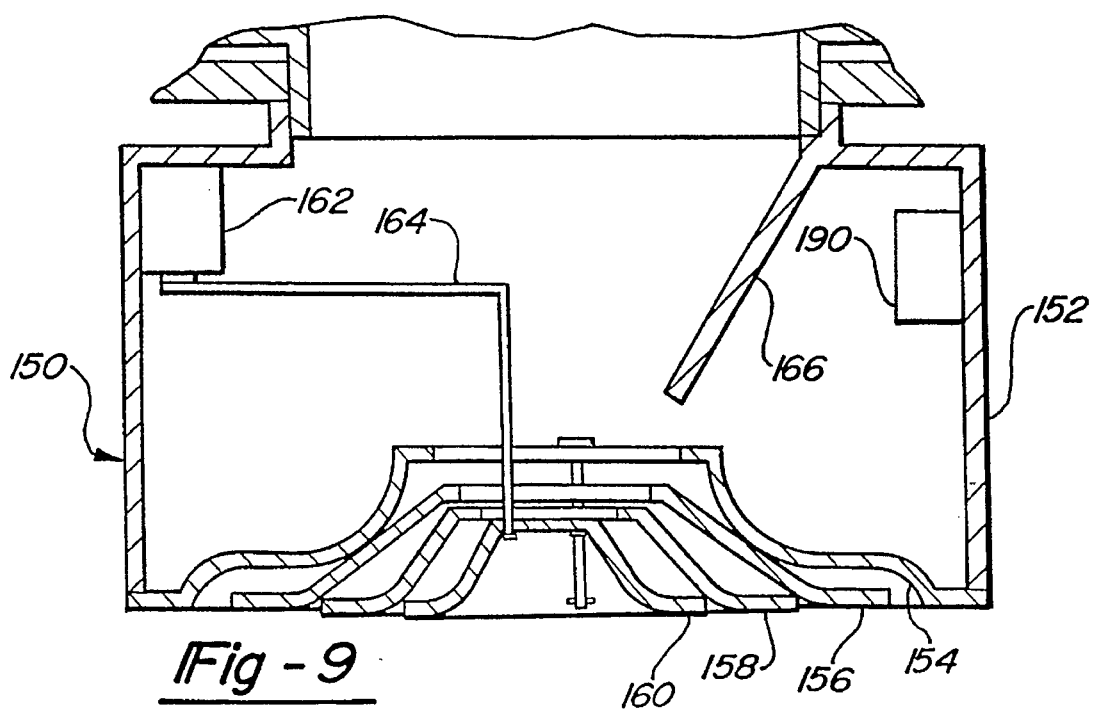
_Fig-9_

ENVIRONMENTAL CONTROL AIRHOUSE WITH VARIABLE OUTPUT

This application is a continuation-in-part of application Ser. No. 08/148,833 filed on Nov. 5, 1993, now U.S. Pat. No. 5,376,045, which is related to the following applications and patents: Ser. Nos. 07/665,352, filed Mar. 6, 1991 issued as U.S. Pat. No. 5,290,200; Ser. No. 07/938,759, filed Sep. 1, 1992 issued as U.S. Pat. No. 5,290,188; and Ser. No. 07/972,572, filed Nov. 6, 1992 issued as U.S. Pat. No. 5,289,696.

BACKGROUND AND SUMMARY OF THE INVENTION

The present invention pertains broadly to airhouses for supplying conditioned air to the interior of an enclosed building, and more particularly to an improved airhouse compatible with existing systems and having reduced initial cost and increased operating efficiency.

In a system developed in recent years by Applicant for maintaining desired atmospheric conditions throughout large industrial-type buildings, the building interior is substantially isolated or enclosed and conditioned air, including sufficient outside air, is continuously admitted through air handling units, or airhouses, located about the building to maintain the interior of the building under a slight positive pressure throughout, slightly greater than the effective outside atmospheric pressure around the building. Various aspects of such a system are described, by way of example, in U.S. Pat. Nos. 4,850,264; 4,960,041; and 5,146,977, as well as the above-identified U.S. patent applications. As discussed at length therein, sensors strategically located throughout the building monitor various atmospheric conditions such as relative interior and exterior atmospheric pressures, temperature, humidity, pollutants and particulate levels, and transmit signals indicative of the readings to a central computer referred to by Applicant as a global control computer. The computer periodically monitors the signals and compares them to stored data representing desired parameters for the atmospheric conditions in the various zones monitored by the sensors. The controllable airhouses strategically located about the building, generally on the roof, are individually regulated in response to signals from the central computer to collectively take corrective measures when a trend is detected for an atmospheric condition in a particular area to fall outside the predetermined parameter.

Airhouses used heretofore in such systems have generally included a sheet metal cabinet housing a heat source, typically a direct-fired gas burner or steam coil, a fan or blower unit, and a system of dampers for regulating admission of air to and discharge of air from the airhouse. The airhouse might also include evaporative humidification equipment. Such airhouses perform well for their intended purpose. However, they have certain limitations which the present invention overcomes.

The airhouses are generally installed on the roof of the structure, and installation of each unit requires substantial modification to the roof structure, so that multiplication of the units adds to the overall cost. In addition, the prior art units have a fixed capacity, that is, the blower units operate at a constant rotational speed to output a constant volumetric flow rate of air. The proportion of outside and building return air is modulated by operating dampers in the outside air and building return air inlets in opposition. In order to provide a straight line variation in damper flow capacity, so that the combined flow of the dampers remains constant, the prior art dampers require a significant area in the airhouse.

In large industrial buildings where a number of airhouses are provided there is a need to individually control airhouses to provide desired building pressurization and the intended environmental conditions at various points within the facility. Consequently the global control central computer which monitors various inputs individually modulates the plurality of airhouses. Currently, these airhouses as well as other designs using a single blower operate in a constant speed mode; namely, that during operation, the blower or blowers turn at a fixed speed and thus a constant volumetric flow rate of air is delivered. In some applications there is a desire to modulate blower output which can be accomplished by providing such airhouses which variable blower speed capability, enabling the blowers to operate either at a number of fixed speed settings, or be continuously variable through a range of speed or output settings. One type of continuously variable blower speed system is termed a variable frequency drive (VFD) which uses a variable frequency AC power supply with a motor operating at a synchronous speed. Variable output capabilities would permit greater modulation of building pressure and air temperature control and reduces the need for frequent cycling of airhouse units. It would be preferred to allow units to operate at lower speed settings where building pressurization and air temperature conditions would permit, which would monitor desired building air circulation.

Although variable speed blowers in environmental conditioning units are known per se, there are particular difficulties which must be addressed in operating new generation airhouses as designed by Applicant in this manner. In many installations these new airhouses use direct fire burners to provide heat input to outside air being delivered through the airhouse. Since during operation of direct fire burners, products of combustion are admitted to the building air, careful control over the combustion process is essential. One of the variables which must be controlled is air velocity through the burner. Without taking particular measures to provide constant burner air flow velocity, changes in blower speed settings would also change burner air flow velocity, producing undesirable consequences. Accordingly, there is a need to provide control systems and strategies which provide constant air flow velocity through direct fire burners in the use of Applicant's airhouses.

The use of Applicant's airhouses in large building environmental control systems represents a significant change from prior art approaches. Prior approaches typically involve a number of individually located exhaust fans coupled with distributed heating units having long duct work intended to deliver air to the lower strata of the factory workspace where workers are typically present. These systems are, by comparison, inefficient due to losses attributed to forcing air to flow through long duct work, and typically cause a significant temperature stratification of air within the building. Applicant's approach however uses a number of roof mounted units without substantial duct work which are intended to direct air through the upper levels of the building interior to the lower levels. In order to accomplish this task, certain diffuser exit velocity parameters must be achieved in order to deliver air to the needed locations within the building interior. As mentioned previously, there are situations where variable speed operation is desired. Typical airhouses have a fixed configuration diffuser for directing air flow in a particular manner. Based on fundamental fluid mechanics principles, using a fixed configuration diffuser, exit air velocity would decrease as blower output also decreases. This would have the undesirable consequence of preventing air delivered by the airhouse to reaching its intended target areas within the building interior. Accordingly, there is a need to provide a mechanism for maintaining desired diffuser exit air velocity through a range of blower volumetric output settings.

In accordance with the present invention, there is provided an improved airhouse having greater air handling capacity than conventional airhouses, thereby reducing the number of such airhouses required for a facility. Matched twin blowers are symmetrically arranged within the airhouse and operated in unison to insure a balanced air flow into the airhouse and through the two blowers. In a preferred embodiment, a burner unit mounted intermediate the blowers is flanked by opposed matching outside air inlet dampers. The dampers may be of a roll-up canister construction whereby the open portion of the inlet opening is unobstructed so that the dimensions of the damper opening are minimized. Other damper types such as those described in related U.S. Pat. No. 5,290,188 could also be used. A building return air inlet having adjustable dampers is also provided. The outside air and building return air dampers are operated in opposed fashion so that the combined flow of air entering the airhouse remains at a desired combined flow area. In one embodiment the twin blowers are driven at the same speed by separate motors, while in an alternate embodiment the blowers are mounted upon a common shaft driven by a single motor. Provisions are made for operating the motor or motors at varying speeds to coordinate the output of the airhouse with required air volume under differing operating conditions so as to minimize operating costs. Heat exchangers may typically be provided within the airhouse for heating or cooling the incoming air, and evaporative humidification units may be included for humidifying the air prior to admission to the building interior. An additional outlet may be provided for each blower unit whereby air withdrawn from the building interior may be selectively vented directly to the outside in a so-called "dump mode" of operation.

The airhouses in accordance with the present invention provide a number of features especially adapted for enabling variable blower speed operation. One or more airhouses of a system include a locally positioned microprocessor based control system termed a distributed control system (DCS), which monitors and controls the airhouse at a high response rate. When the centralized global control computer sends a command for a particular unit to change its speed set point, burner air velocity is maintained despite changes in blower setting by adjusting dampers which control the admission of outside air and building return air. These airhouses include sensors for monitoring air velocity through the direct fire burner which provide inputs to the DCS. In prior designs of Applicant's airhouses a reciprocal flow area relationship existed between building return air and outside air inlet area to maintain total flow area constant through changes in quantities of outside air and building return air being admitted. In units with variable speed blower VFD, a reciprocal relationship continues to exist but the total area of inlet-airflow is a function of blower speed setting.

Another feature of the airhouse according to the present invention is the incorporation of variable flow area diffuser assemblies. These units for discharging air from the airhouse have features for changing their cross-sectional flow area in an effort to maintain constant or near constant exit flow velocity through a range of volumetric discharge rates. Control of this feature is automatic in that a static pressure transducer is used in a plenum to which the diffuser is attached. An actuator changes the diffuser flow area in response to inputs from a pressure transducer in the plenum. As blower discharge rate decreases, static pressure in the plenum too will decrease, triggering the diffuser controller unit to actuate the diffuser to decrease flow area, thereby providing greater flow resistance and constant pressure in the plenum. Various configurations of variable discharge diffuser assemblies can be used, including those providing continuously variable flow areas as well as fixed or multiple position devices which provide a step-wise changes in flow resistance. The later devices may be especially useful in connection with multiple speed blowers which do not provide continuously variable speed but rather step-wise output modulation.

This invention further involves control strategies for airhouses incorporating variable blower speed drive systems.

Further objects, features and advantages of the invention will become apparent from a consideration of the following description and the appended claims when taken in connection with the accompanying drawings.

BRIEF DESCRIPTION OF THE DRAWINGS

FIG. 1 is a longitudinal vertical section schematically illustrating an airhouse in accordance with an embodiment of the invention;

FIG. 3 is a vertical section illustrating an alternate embodiment of the outside air inlet section of the airhouse;

FIG. 8 is an enlarged cross-sectional view through a variable area diffuser in accordance with an embodiment of this invention shown in a high flow area position;

FIG. 9 is an illustration similar to FIG. 8 but showing the diffuser in a low flow area condition;

DETAILED DESCRIPTION OF THE PREFERRED EMBODIMENT

Figure 2:
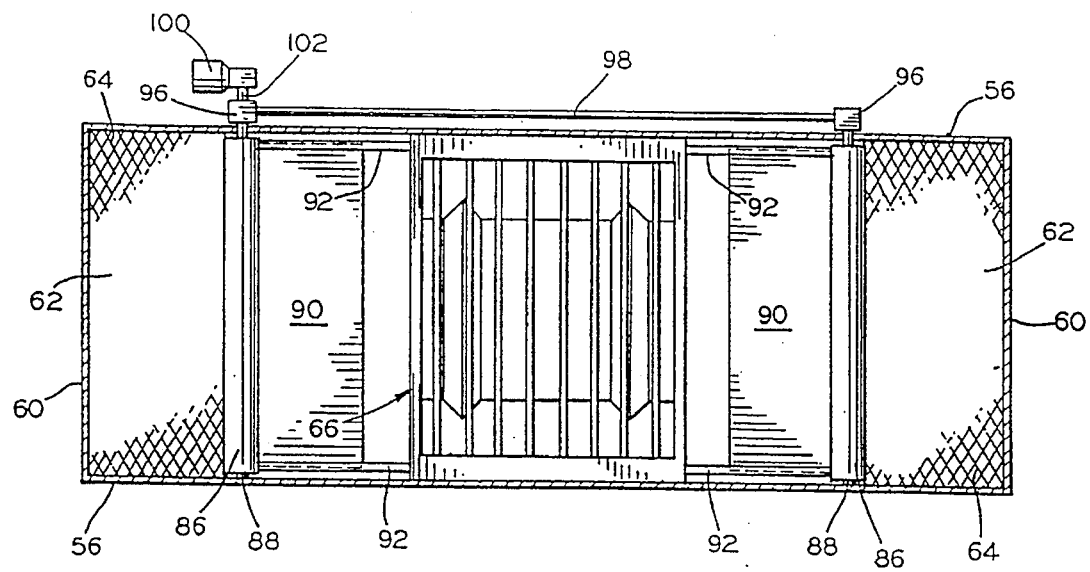
FIG. 2 is a top plan view, taken substantially along line 2—2 of FIG. 1, of the inlet section of the airhouse.

With reference now to the drawings, and particularly to FIG. 1, there is shown generally at 10 an air handling unit or airhouse embodying the invention. More particularly, the airhouse comprises a box-like enclosure structure 12 of generally rectangular configuration mounted as on the suitably supported roof 14 of a building (not shown) in a conventional manner. The structure 12 may conventionally comprise a skeletal framework (not shown) carried upon a roof curb or base 16 of structural angle members, enclosed by panels 18. An inlet section 20 of generally T-shaped cross section sits atop the structure 12.

The airhouse 10 is designed to condition and deliver outside air and/or recirculated indoor air at a high volume into the building interior and to modulate the proportions of the two so as to deliver a composite flow at the desired condition and with a volume of outside air sufficient to maintain the desired pressurization within the building. To that end the airhouse includes, on either side of the inlet section 20, a blower section 22. In order to balance the air flow into and through the unit, and in particular through and along the burner unit as will be hereinafter described, the blower sections are symmetrical and of generally identical construction and capacity.

The blower sections 22 are in communication with a central chamber 24 within the airhouse. There is located within each blower section 22 a blower unit 25 including a scroll housing 26 within which an impeller (not shown) is mounted for rotation on a shaft 28 suitably journalled at its opposite ends. A motor 36 is drivingly coupled to the impeller by means of a belt 38 entrained about a pulley 40 of the motor and a sheave 42 on the shaft 28. By way of example, the blower units 25 may each be of 100,000 cubic feet per minute volumetric capacity. Air is discharged from the scroll housing 26 through an outlet 44 and corresponding opening in the roof 14, and through a suitable directional diffuser unit 46 into the interior of the building.

While the invention has been illustrated and described as employing a blower of scroll-type construction, it will be readily understood that other and different blower constructions may be employed as well. For example, for some installations, conventional impeller and shroud fan units commonly employed in the field and as will be hereinafter described, may be incorporated in the blower sections 22. It is essential that the blowers or fans of the two blower sections, regardless of their type, be of matched performance, that is, that they create generally identical flow characteristics through the airhouse.

As indicated above the inlet section 20 is generally T-shaped in cross section and includes a base section 50 opening into the chamber 24 and defined by opposite side walls 52 and end walls (not shown). A cap section 54 defined by opposite side walls 56, a cover 58 and opposite end walls 60 extends laterally beyond the walls 52 so as to define between the walls 52 and 56, elongated inlet openings 62 through which outside air is drawn by the blower units. Screens 64 may be provided over the inlet openings to exclude animals and debris.

In one embodiment as illustrated in FIGS. 1 and 2, there is mounted intermediate the side walls 52 of the base 50, in the throat of the inlet section 20, a direct fire burner assembly identified generally at 66. Burner assembly 66 is mounted intermediate spaced partition walls 70 extending across the inlet section 20 and defining a burner chamber 72. The burner assembly 68 is connected to a suitably regulated hydrocarbon fuel supply in the usual fashion. The partition walls 70 and adjacent side walls 52 define therebetween outside air inlet passages 74, the passages 74 being of equal width and length so as to present identical profiles for air flow purposes. A damper 76 is provided at the entrance to the burner chamber 72. The damper may suitably be a so-called parallel blade louver type as shown in FIGS. 1 and 2. Operation of blower sections 22 generate a negative pressure within central chamber 24 thus causing outside air to enter the central chamber 24 through damper 76 and through the blower assembly 66.

As described in the aforementioned patents, the burner assembly 66 is designed so that the burner chamber has a predetermined specific area relationship to the combined areas of the inlet passages 74, typically an 80/20 or 70/30 inlet-area-to-burner-chamber-area relationship. In operation, the burner damper 76 must be in the fully open position for the burner assembly 66 to be operable. At such times as the burner is not operated, the damper 76 is closed to close off the burner chamber 72. To that end a motorized drive unit 78 is operably connected to the damper 76 for selectively moving it between the opened and closed positions. As illustrated in FIG. 1 the damper is in the open, burner-on position.

As heretofore indicated, the airhouse 10 is adapted to supply a combination of outside air and building return air in selected proportions through the outlets 44 and diffuser units 46 to the interior of the building. Depending upon the need for heated air to maintain the temperature within the building at the desired temperature, a portion of the incoming outside air may be drawn through the burner assembly 66. A building return air inlet 80 is provided in the lower wall or floor of the airhouse for admitting return air from the building interior to the central chamber 24. In order for the modulated flow of combined outside air and building return air to remain constant as the proportions are varied in response to building demand, the area of the return air inlet 80 is equal to the combined area of the two outside air inlet passages 74.

Dampers are provided for regulating the air flow through the inlet passages 74 and the return air inlet 80 and for appropriately apportioning the flow between the outside air and the return air. Various types of dampers have been employed heretofore for that purpose, and while those dampers have been found to have certain limitations for the purposes of the present invention. Thus, louvered dampers of the so-called parallel blade and opposed blade types provides large flow capacity in their fully open positions for a given damper area. However, they do not provide a uniform variation in air flow capacity as they are adjusted, so that they do not provide a uniform combined flow through the outside air and return air inlets as desired. More recently employed slide or "shear" dampers, on the other hand, perform very well in providing uniform variation in air flow capacity as they are adjusted. However, their overlapping sliding elements generally dictate that a maximum of one-half of the damper area is available for air flow in the fully open position. Thus, the damper area must be relatively large to provide the needed flow capacity. The dual blower system of the present invention requires that air flow through the two outside air inlets 74 be equal at all times, and that the air flow vary in a linear or straight line manner as the dampers in the outside air inlets 74 and the return air inlet 80 are adjusted in opposition.

In order to overcome the above-noted limitations of the prior art devices, dampers 82 and 84 of a canister or roll-up type are preferably provided for the inlet passages 74 and the return air inlet 80, respectively. The dampers are of similar construction and, as best seen in FIGS. 1 and 2, may comprise a cylindrical sheath or canister 86 extending across the inlet opening and having a suitable reeling or winding means therewithin such as a drum (not shown) mounted for rotation upon a shaft 88. A damper element 90 is mounted so as to be selectively extended from and retracted into the canister 86 by manipulation of the reeling means and shaft 88. By way of example, the damper element 90 may be a suitable flexible metal or plastic sheet material, or it may comprise hinged or interlocking transversely extending strips as conventionally employed in roll-up type overhead doors.

The opposite longitudinal edges of the damper elements of the damper 82 are slidably received in channel members 92 (FIG. 2) extending across the ends of the inlet passages 74. In order to provide balanced flow to the two blower sections 22, two of the dampers 84 are employed in the return air inlet 80. The dampers are positioned along the edges of the inlet opening, with the damper elements 90 operating in opposed fashion and converging toward an intermediate divider bar 94 extending across the inlet. As will be hereinafter explained, the dampers 84 operate in unison so that the openings on either side of the divider bar 94 remain equal to insure balanced air flow to the two blower sections.

The dampers 82 are operatively interconnected for simultaneous opposed adjustment to maintain equal damper openings in the two inlet passages 74. The dampers 84 are likewise operatively interconnected for simultaneous opposed adjustment to maintain equal damper openings on either side of the divider bar 94 within the return air inlet 80. The pairs of dampers 82 and 84 are operatively interconnected by a central programmable controller or a locally positioned distributed controller which acts as a damper controller to operate in opposition so as to maintain the combined area of the damper openings, and hence the volume of air drawn in to the central chamber 24, uniform as the proportions of outside air and building return air are varied in response to building requirements.

As will be seen in FIG. 2, each of the shafts 88 of the dampers 82 may be coupled to a right angle gear box 96. The gear boxes are operatively interconnected by a drive shaft 98. A reversible gear reduction drive unit 100 is operatively connected by an output shaft 102 to one of the gear boxes 96 for rotating the associated shaft 88 to extend or retract the damper element 90. The drive shaft 98 simultaneously drives the other gear box 96, which is configured to extend or retract its associated damper element 90 in opposition to the first damper element. A similar drive system can be implemented for dampers 84. As will be readily apparent, other and different means may be employed for operatively interconnecting the pairs of dampers. For example, a chain and sprocket arrangement may be substituted for the right angle gear boxes and drive shaft, or separate electronically controlled drive units might be employed.

In order to thermally condition the air or to add moister for humidification purposes prior to admission to the building interior at such times as may be desirable, conventional heat exchangers and/or humidifying means may be provided within the airhouse. Accordingly, either or both thermal heat exchangers 104 and evaporative humidification units 106 of conventional construction may optionally be positioned in the flow paths of the air through the airhouse as shown in FIG. 1.

In some instances it may not be feasible to employ open fired gas burners as the source of heat for the airhouse. In such situations heat may be provided as by the thermal heat exchangers 104 which may, for example, comprise steam coils. In that event the inlet section 20 is modified as illustrated in FIG. 3 to omit the burner assembly 66. The throat of the inlet section may be narrowed so that the area of the inlet passage in the inlet section is equivalent to the area of the building return air inlet 80. Dampers 84 and an intermediate divider bar 94 similar to those at the return air inlet are provided for the inlet section.

Figure 4:
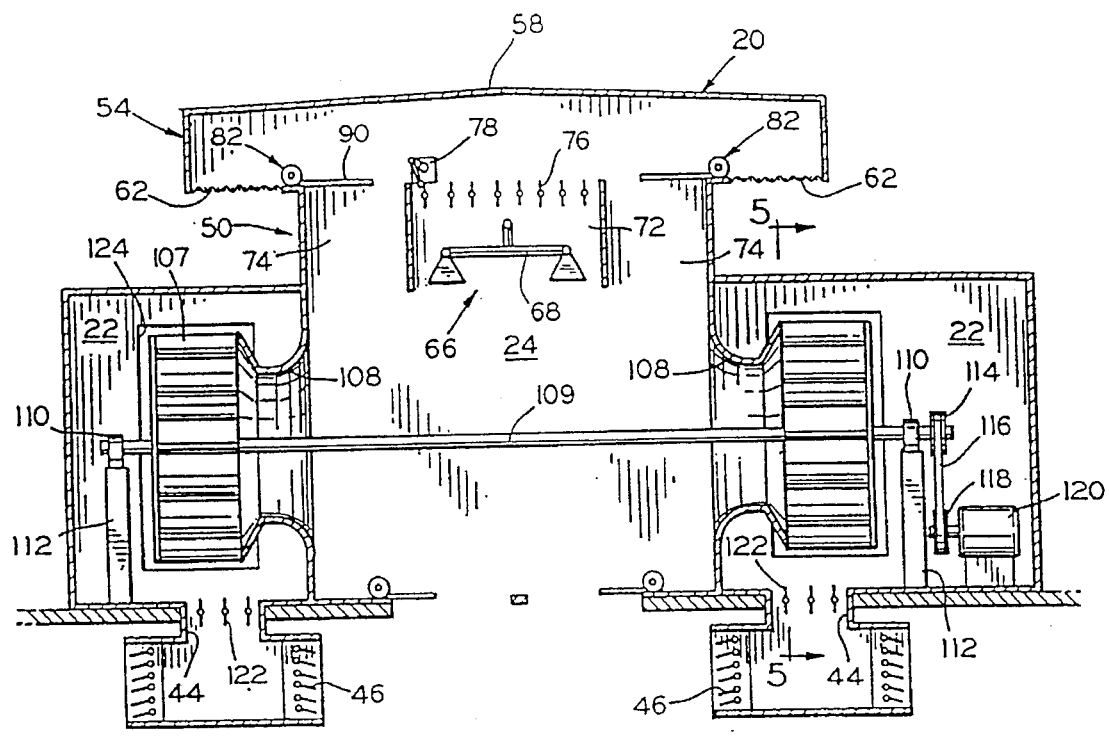
FIG. 4 is a longitudinal vertical section similar to FIG. 1, illustrating an alternate embodiment of the invention.

There is shown in FIG. 4 an alternate embodiment of the invention wherein there is located within each blower section 22 a blower unit including an impeller unit 107 and an associated shroud 108. The impellers 107 of the two blower sections are mounted upon a common shaft 109. The shaft is journalled for rotation in bearings 110 carried by pedestals 112 mounted as within the opposite blower sections 22. There is affixed to extended portion of the shaft 109 a pulley 114 drivingly coupled by a belt 116 to the output pulley 118 of a suitably controlled motor 120. The impellers 107 are suitably configured to draw air from the central chamber 24 into the oppositely disposed blowers mounted upon the common shaft 108. The two blowers are thus driven by the single motor 120 to assure equal impeller speed and balanced air flow through the two blower sections 22.

It is, of course, fully contemplated that some existing airhouses of conventional construction may be modified and retrofitted to incorporate the twin blower concept or other concepts of the present invention.

Figure 5:
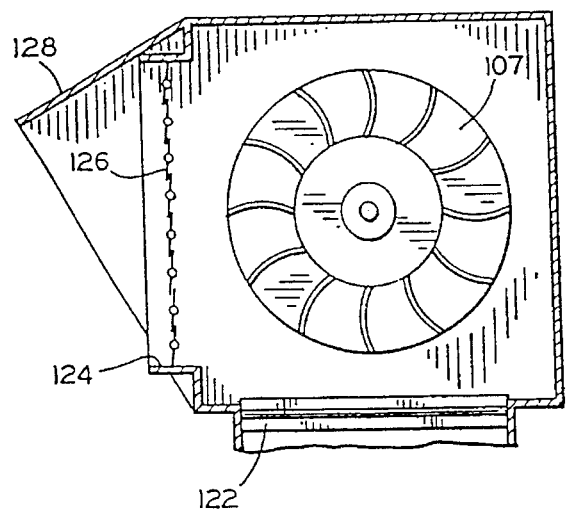
FIG. 5 is an end view taken substantially alone line 5—5 of FIG. 4.

The twin blower airhouse of the present invention, due to its capacity for handling large volumes of air in a localized area, is also particularly well suited to rapidly evacuating air from a localized area of the building interior to the outside atmosphere. To that end in accordance with the invention, as illustrated in FIGS. 4 and 5, the outlet openings 44 from the blower sections 22 may be provided with suitable dampers 122 moveable between fully open and fully closed positions. Since the damper 122 will be operated in either the fully open or the fully closed position, it may suitably be of a conventionally controlled louver type. There is additionally provided in a side wall of the blower section 22 an outlet passage 124 opening to the external atmosphere. A damper 126, which again may be of the louver type movable between fully open and fully closed positions, is provided in the outlet passage. A hood 128 (FIG. 5) may be conventionally provided over the outlet passage and damper to protect against entry of rain and snow.

During normal operations, the dampers 122 will be in the fully open position and the dampers 126 will be in the fully closed position so that air may be drawn into the central chamber 24 through the burner chamber 72, inlet passages 74, and return air inlet 80 as appropriate, and directed through the outlets 44 to the building interior. However, if a buildup of contaminated air is noted in the vicinity of the airhouse by the control mechanism and it is deemed advisable to exhaust the air to the outside, a sequence of events is initiated by the control mechanism whereby the burner assembly 66 is shut down, the dampers 76 and 82 are completely closed, the dampers 84 and 126 are fully opened, and the dampers 122 are fully closed. The airhouse 10 then rapidly extracts contaminated air from the building interior through the return air inlet 80 and exhausts it to the outside atmosphere through the outlet passage 124.

A sufficient number of the airhouses is utilized to provide the capacity necessary for supplying conditioned air to the building interior during periods of maximum demand, for example during the winter heating season. With conventional constant-volume, constant-blower-speed airhouses, sufficient air can be provided to maintain the desired building pressurization during certain periods, as during the non-heating season, using primarily building return air with a minimum of outside makeup air being drawn in through the outside air inlets 62. However, the power demand for operating the airhouse blowers remains constant. With the high capacity of the twin blower airhouse of the present invention, it is possible to design the airhouse with variable capacity so as to reduce the volume of air handled during times of off-peak demand, while still providing the high volume of air required during peak demand periods. Thus, the motor or motors on the blowers are provided with conventional variable speed controls so that the speed of the blowers can be adjusted in response to the demand for air volume. The desired level of building pressurization can then be maintained using primarily outside air mixed with a minimum of building return air. The resulting reduction in energy required for operating the blowers represents a very significant saving in the cost of operation.

Figure 6:
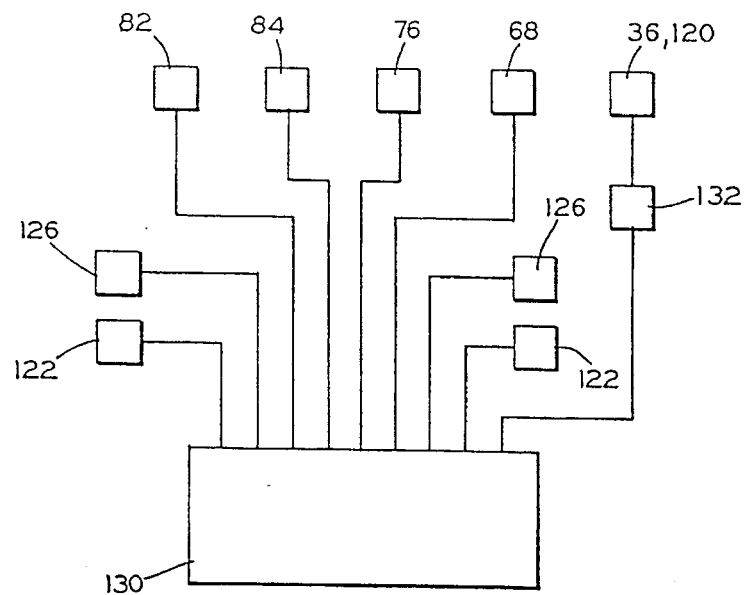
FIG. 6 is a diagram schematically illustrating a control system for the invention.

There is shown in FIG. 6 a diagram schematically illustrating a control system for the novel airhouse. Thus, a plurality of the airhouses 10 may be suitably linked to a central programmable computer 130 for integrated operation, as described in the aforementioned related patents. The blower motors 36 or 120 are suitably operably connected, either directly or through a blower speed controller 132 which provides a means for controlling blower speed, to the computer 130. The burner assembly 66 and the burner damper 76, as well as the dampers 82, 84, 122 and 126 are likewise operably coupled which provides a burner control means for integrated operation in the aforedescribed manner. The control functions can reside exclusively within computer 130, or may be shared with distributed controllers, as will be described in more detail below.

Figure 7:
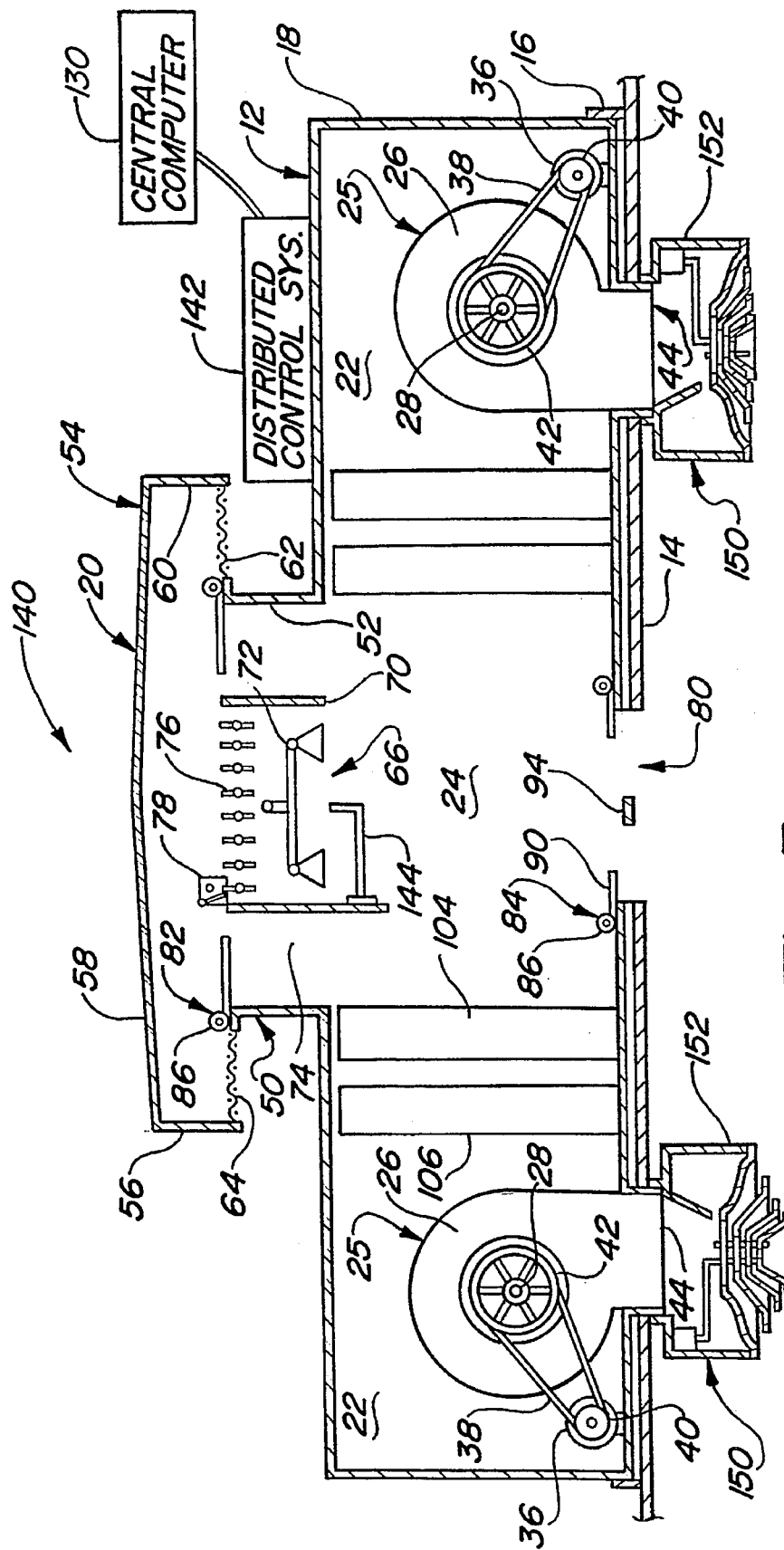
FIG. 7 is a longitudinal vertical section schematically illustrating an airhouse in accordance with an alternate embodiment of this invention featuring a variable blower speed drive system.

An airhouse in accordance with a third embodiment of this invention is illustrated in FIG. 7 and is generally designated by reference number 140. Airhouse 140 is substantially identical to that illustrated in FIG. 1 except that it includes a number of features especially adapted for variable blower speed operation. It should be noted that the principles described in connection with the embodiment of FIG. 7 are equally applicable to various other airhouse configurations, including those such as described in FIG. 4 which may include one or more blower units. Since many of the features of airhouse 140 shown in FIG. 7 are identical to that shown in the prior figures, these features are identified by like reference numbers.

In FIG. 7 central computer 130 is shown connected with a distributed intelligence system referred to as a distributed control system 142 which provides closed loop control for a number of subsystems within airhouse 140, including those related to variable blower speed operation. For the purposes of this description distributed control system 142 with central computer provide a blower speed control means which provides signals to blower units 25 causing them to operate at variable speed settings. Various types of speed control systems can be provided. For example, for synchronous type motors 36 such as induction types, the frequency of the alternating current power applied to the motors can be adjusted to provide a range of motor revolution speeds, which in turn directly changes the speed of the blower scroll wheels. Other potentially useful forms of blower speed controllers would include drive motors having multi-speed capability which can provide multiple step-wise speed changes but do not provide continuously variable speed adjustment capability.

In the embodiments shown in FIGS. 1–6, it was stated that a fixed total area of airflow through outside air inlets passages 74 and return air inlet 80 is provided by coordinating the adjustment of their associated dampers using a damper controller. A desired total flow area is provided despite changes in the proportion of outside air to building return air entering airhouse 140. As mentioned previously, the maintenance of this constant inlet area is important to maintain a constant air flow velocity through burner assembly 66 essential for providing proper combustion. However, if the blower speed changes and this constant area relationship is maintained, burner air velocity would change, leading to undesirable consequences. Accordingly, airhouse 140 includes automatic damper control features for maintaining constant burner assembly airflow velocity. As shown in FIG. 7, a velocity pressure measuring device such as a pitot tube transducer 144 is provided which generates an output signal related to burner assembly air flow velocity. That signal is inputted to distributed control system 132 which, acting as the damper controller, controls dampers 82 and 84 such that the total flow area is reduced as blower output is reduced to provide constant burner assembly air flow velocity. Conversely, as blower speed increases, the total flow area provided by dampers 82 and 84 is increased to produce the same effect. Various control algorithms can be employed to provide constant burner assembly air flow velocity. For example, a predetermined total air flow inlet area can be associated which maximum or 100% blower speed, and as blower speed decreases to a lower total area can be defined. Thus, a stored table of blower speeds and associated inlet areas can be created. While the blowers are operating at a given speed, modulation of building pressurization and air discharge temperature can be achieved by changing the position of dampers 82 and 84 in a coordinated fashion to maintain constant total inlet flow area for that speed setting, as discussed in connection with the earlier figures.

In a typical installation, a number of individual airhouses 140 would be controlled by central computer 130. Based on inputs from distributed temperature measuring devices, central computer 130 sends commands to individual airhouses indicating that they should be operating in a burner-on or burner-off mode. Central computer 130 sends blower speed commands to distributed control systems 132 associated with each airhouse 140. These commands may be in the form of a set point speed which can be thought of in terms of percent of maximum speed. For example, a speed variation range of 100 to 30 percent may be achievable. The distributed control system 142 will, through its blower speed controller, change blower speed unless certain conditions exist. For example, if the burner assembly air flow velocity is not stabilized in a given range, blower speed will not be immediately changed. Other factors could also interrupt the making of immediate changes in blower speed. Central computer 130 also acts as a burner controller by sending burner commands to the various airhouses 140.

The speed set points for the various airhouses 140 are adjusted in response to building pressurization requirements and perhaps from another input, such as the position of outside air dampers 82. A control approach can be used in which the speed of the blowers will not be increased until the outside air dampers 84 have reached a predetermined opening position. Distributed control system 132 may also respond to inputs of the position of return air dampers 84. Central computer 130 controls individual airhouses 140 independently in response to environmental conditioning needs in various areas of the building, both in terms of pressurization, temperature, and other factors.

The variable speed function of airhouse 140 is also implemented in the heat-off mode of operation. In that mode the variable speed capability is implemented to control building interior static pressure. As building pressure rises, the speed of blowers will decrease. In the heat-off mode it is not necessary to maintain constant burner assembly flow velocity since combustion is not occurring. However, if the constant burner air flow velocity level is maintained during the heat-off mode the system is ready for immediate transition to the heating mode in any time. Accordingly, it is preferred to operate dampers 82 and 84 to control blower air velocity during the heat-off mode. In the heat-off mode, dampers 82 and 84 move in relation to one another to provide a desired discharge air temperature which can be adjusted when building inside air and outside air temperatures are different. This modulation is achieved until the outside air damper 82 closes below a minimum value which is likely to cause building pressure to decrease unacceptably. In this event, the output of the blowers is increased. By controlling the motion of the outside air and return air dampers 82 and 84 using a locally positioned distributed control system 132 high response rate control can be provided.

Airhouse 140 also includes additional features especially oriented toward its variable speed operation capability. At various blower output settings, differing volumetric flow rates of air are delivered to the diffuser units 46. Since those units as shown in FIG. 1 are not adjustable, changes in volumetric flow rate cause a direct change in exit air velocity pressure. This may be undesirable where there is a need to deliver air to remote locations within a large building area as is typically the case. Accordingly, the embodiment of FIG. 7 incorporates a pair of variable flow area diffuser units 150 which are mounted to plenum boxes 152. Diffuser units 150 can be actuated to change their effective discharge flow area, and consequently, the velocity pressure of air being discharged. Diffuser unit 150 is a modified version of a type of conventional diffuser unit. Diffuser unit have a number of concentrically oriented and rotationally symmetric funnel-shaped ducts 154, 156, 158 and 160. Duct 154 has the largest diameter and defines the outer perimeter of the unit, whereas duct 160 is a central closed cone. Ducts 154 through 160 are suspended such that their relative positioning can be changed. The position of the diffuser unit ducts shown on the lefthand side of FIG. 7 and in FIG. 8 illustrate the ducts in their full flow area condition. A diffuser actuator 162 is provided within plenum box 152 and is coupled via cable 164 to duct 160. Through command signals from a diffuser controller within distributed control system 132, actuator 162 can change the effective length of cable 164. The righthand side of FIG. 7 and FIG. 9 show diffuser unit 150 in its minimum flow area condition in which the ducts 154 through 160 are stacked closely together.

During operation of diffuser unit 150 velocity pressure of air escaping plenum box 152 tends to cause the ducts 154 through 160 to be urged to the position shown in FIG. 8. FIG. 9 shows actuator cable 164 in a fully retracted position in which center duct 160 is drawn against duct 158 thereby reducing the flow path area for exit air.

In most instances it is not desirable to discharge air from diffuser units 150 in a uniform 360° pattern since heated air escaping from the diffuser unit aimed toward the mid-point of the airhouse can be directly drawn into building return air inlet 80. Accordingly, shroud 166 is provided which directs airflow in a desired manner such that the discharge pattern can be emphasized in certain arc segments of diffuser unit 150. The figures show blowers 180 on one side of the unit closed for that purpose.

Figure 10:
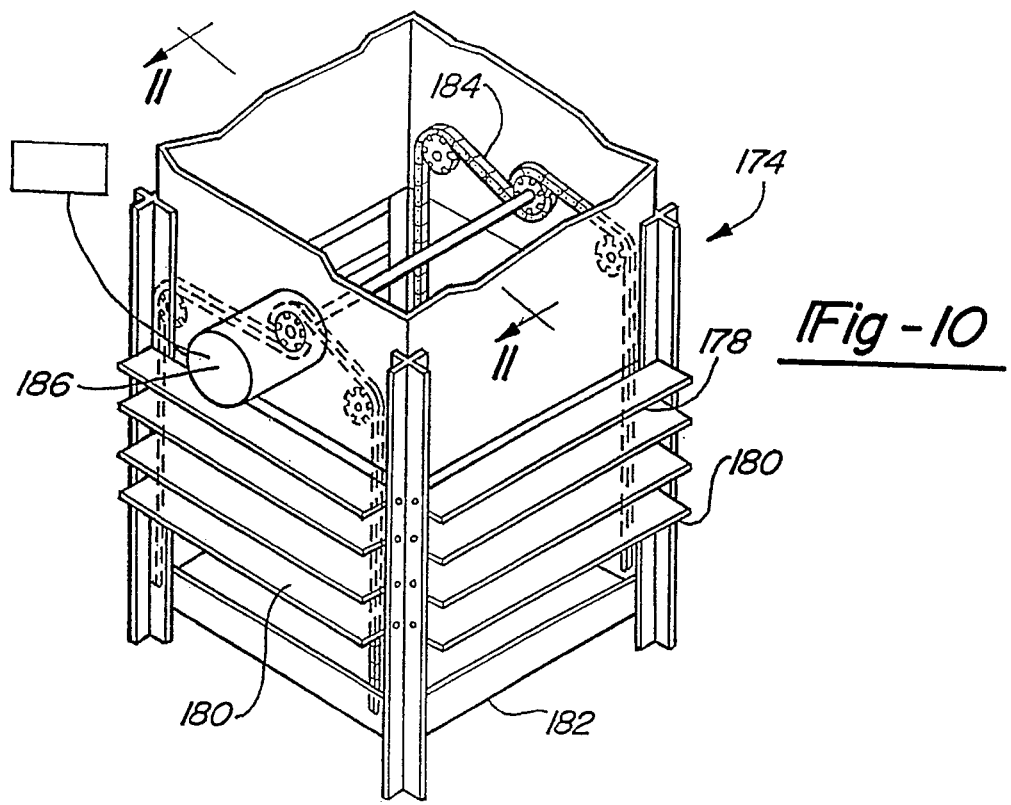
FIG. 10 is a pictorial view of a variable area diffuser in accordance with a second embodiment of this invention.
Figure 11:
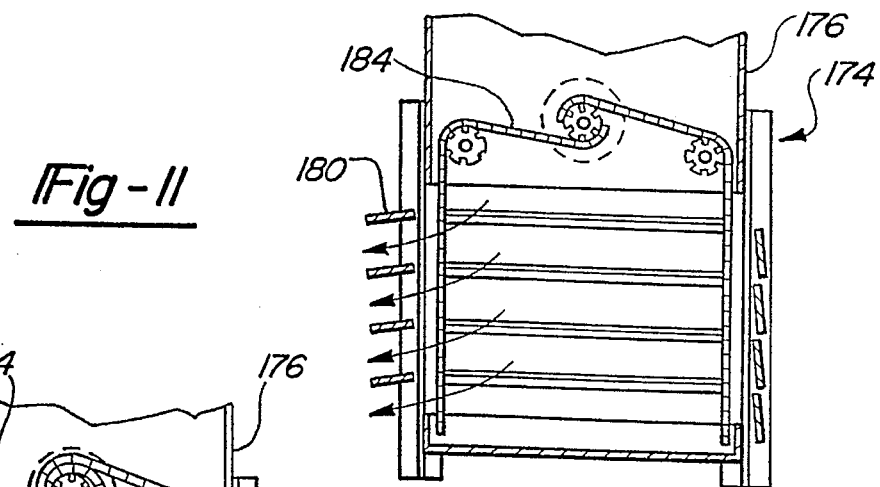
FIG. 11 is a side view of the variable area flow diffuser shown in FIG. 10 in a high flow area condition.
Figure 12:
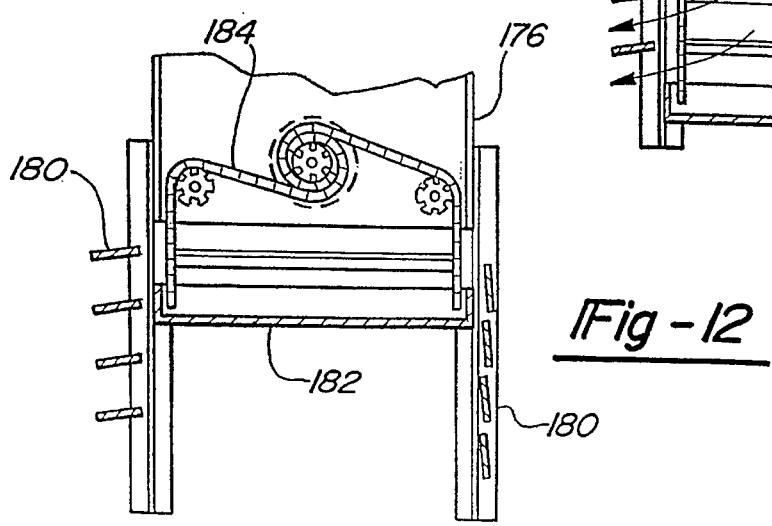
FIG. 12 is a view similar to FIG. 11 but showing the diffuser actuated to provide a low flow area.

FIG. 10 through 12 illustrate an alternate embodiment of a variable flow area diffuser unit 174. As shown the unit includes a housing 176 in the form of a rectangular box defining four identical sides. Each side features discharge openings 178 having adjustable flow louvers 180. Louvers 180 can be adjusted to direct air flow in a particular direction or can be moved to a fully closed position to block air flow from emitting from a particular side of the unit. Splash pan 182 is suspended via cables 184 to move between parallel positions within housing 176. Actuation of cable 184 will cause pan 182 to raise or lower within housing 176 which in turn changes the effective discharge air flow area. FIG. 11 shows the pan 182 in its lowermost maximum flow area position, whereas FIG. 12 shows the pan in a raised position which reduces the effective diffuser outlet flow area.

One possible control strategy for operating variable flow area diffuser units 150 and 174 implements a static pressure transducer 190 located within plenum boxes 152 which inputs a signal to distributed control system 132 which acts as an automatic diffuser controller. Controller 132 in turn sends command signals to actuator 162. One potential control strategy would be to instruct controller 132 to attempt to maintain constant static pressure within plenum box 152. Thus, as blower speed decreases, static pressure in the plenum box will drop which would prompt distributed control system 132 to command actuator 162 to decrease its effective exit flow area. Conversely, an increase in blower speed would increase static pressure in the plenum box causing flow area to be increased. By maintaining tiffs constant "back pressure" on the blowers, a minimal disruption of air velocity through direct flame burner assembly 66 will occur. Similarly, by maintaining this constant static pressure in plenum box 152 the differential pressure between the interior of the plenum box and the building interior remains constant, and thus the changes in the diffuser unit discharge area will provide uniform or near uniform exit velocity pressure through a range of blower output settings. Consequently, even at low blower speed settings, the airhouse 140 can provide desired air circulation.

It is to be understood that the forms of the invention herewith shown and described are to be taken as illustrative embodiments only of the same, and that various changes in the shape, size and arrangement of parts, as well as various procedural changes, may be resorted to without departing from the spirit of the invention.

I claim:

1. An airhouse for supplying conditioned air in controlled amounts to the interior of a building, comprising:

an enclosure defining a central chamber, outside air inlet means for allowing air from outside said interior to enter said enclosure central chamber, a direct fire burner for combusting a hydrocarbon fuel receiving air from said outside air inlet means and supplying said air from said outside air inlet means to said central chamber, outside air inlet damper means for adjustably controlling the inlet flow area through said outside air inlet means into said central chamber, return air inlet means for allowing air within said building interior to enter said enclosure central chamber, return air inlet damper means for adjustably controlling the inlet flow area through said return air inlet means into said central chamber, blower means mounted to said enclosure having an inlet communicating with said enclosure central chamber and an outlet for discharging air into said building interior, blower speed control means for adjustably controlling the volumetric output rate of said blower means, and damper control means for controlling said outside air inlet damper means and said return air inlet damper means whereby the total airflow area defined by said outside air inlet damper means and said return air inlet damper means provides airflow velocity through said direct fire burner within a range determined to produce proper combustion through a range of settings of said volumetric output rates of said blower means.

2. An airhouse for supplying conditioned air according to claim 1 further comprising:

airflow measuring means for measuring the airflow rate of air flowing through said direct fire burner, and wherein said damper control means adjusts said outside air inlet damper means and said return air inlet damper means to maintain airflow velocity through said burner within said range through a range of settings of said volumetric output rates of said blower means.

3. An airhouse for supplying conditioned air according to claim 1 wherein said damper control means maintains a constant total area of airflow through said outside air inlet damper means and said return air inlet damper means for a particular volumetric output rate of said blower means and wherein said constant total area varies as a function of the volumetric output rate of said blower means.

4. An airhouse for supplying conditioned air according to claim 1 further comprising a central controller which receives environmental condition inputs from remote sensors distributed about said building interior and said central controller outputting a blower speed command to said airhouse.

5. An airhouse for supplying conditioned air according to claim 4 further comprising a distributed controller dedicated to said airhouse which receives signals from said central controller and controls said blower speed control means based on said blower speed commands and the position of said outside air inlet damper means and said return air inlet damper means.

6. An airhouse for supplying conditioned air according to claim 1 further comprising burner control means for causing said burner to cycle between a burner-on mode during which said hydrocarbon fuel is combusted and a burner-off mode where combustion does not occur and said damper control means maintaining said airflow velocity through said direct fire burner within said range during both of said modes whereby said airhouse is ready for the burner-on mode while it is in the burner-off mode enabling rapid cycling through burner-on and burner-off modes.

7. An airhouse for supplying conditioned air according to claim 1 wherein said blower speed control means provides continuously variable blower volumetric discharge rates over a range of said rates.

8. An airhouse for supplying conditioned air according to claim 1 wherein said blower speed control means provides a plurality of discrete blower volumetric discharge rates.

9. An airhouse for supplying conditioned air according to claim 1 wherein said airhouse further comprises a diffuser unit for directing the discharge of air from said blower means within said building interior, said diffuser unit having means for providing adjustable discharge flow area whereby the flow restriction of air through said diffuser unit is variable in response to the volumetric discharge rate of said blower means enabling a desired discharge air velocity to be maintained through a range of volumetric discharge rates.

10. An airhouse for supplying conditioned air according to claim 9 further comprising a diffuser unit actuator for adjusting said diffuser unit discharge flow area and a diffuser unit controller means for sending actuation signals to said diffuser unit actuator.

11. An airhouse for supplying conditioned air according to claim 10 further comprising a plenum receiving air from said blower means and having said diffuser unit attached thereto, and a pressure transducer for sending signals related to air pressure in said plenum to said diffuser unit controller means.

12. An airhouse for supplying conditioned air according to claim 11 wherein said diffuser unit controller maintains a constant pressure in said plenum through a range of blower volumetric output settings by controlling said diffuser unit actuator.

13. An airhouse for supplying conditioned air in controlled amounts to the interior of a building, comprising:

an enclosure defining an interior volume, heating means for heating air in said enclosure interior volume, outside air inlet means for allowing air from outside said interior to enter said enclosure interior volume, outside air inlet damper means for adjustably controlling the inlet flow area through said outside air inlet means into said enclosure interior volume, return air inlet means for allowing air within said building interior to enter said enclosure interior volume, return air inlet damper means for adjustably controlling the inlet flow area though said return air inlet means into said enclosure interior volume, blower means mounted to said enclosure having an inlet communicating with said enclosure interior volume and an outlet for discharging air to said building interior, blower speed control means for adjustably controlling the volumetric output rate of said blower means, damper control means for controlling said outside air inlet damper means and said return air inlet damper means to maintain a desired total airflow area defined by said outside air inlet damper means and said return air inlet damper means, diffuser means for discharging air from said airhouse into said building interior, said diffuser means being adjustable to provide a variable discharge flow area, and diffuser controller means for adjusting said diffuser means in response to changes in said blower volumetric output rate.

14. An airhouse for supplying conditioned air according to claim 13 further comprising a diffuser unit actuator for adjusting said diffuser unit discharge flow area and a diffuser unit controller means for sending actuation signals to said diffuser unit actuator.

15. An airhouse for supplying conditioned air according to claim 13 further comprising a plenum receiving discharge air from said blower means and having said diffuser unit attached thereto, and a pressure transducer for sending signals related to air pressure in said plenum to said diffuser unit controller means.

16. An airhouse for supplying conditioned air according to claim 15 wherein said diffuser unit controller maintains a constant pressure in said plenum through a range of blower volumetric output settings by controlling said diffuser unit actuator.

17. An airhouse for supplying conditioned air according to claim 13 wherein said diffuser unit comprises a plurality of shells concentrically arranged defining airflow passages therebetween and wherein said diffuser unit actuator changes the relative spacing between said shells thereby change the airflow area therebetween.

18. An airhouse for supplying conditioned air according to claim 13 wherein said diffuser unit comprises an elongated housing with airflow passages and comprising a pan which is movable within said elongated housing to effectively change the area of airflow discharge passages through which air escapes from said diffuser unit.

19. A building air environmental control system comprising:

a plurality of airhouses distributed about said building, each of said airhouses comprising, an enclosure defining a central chamber, outside air inlet means for allowing air from outside the interior of said building to enter said enclosure central chamber, a direct fire burner for combusting a hydrocarbon fuel receiving air from said outside air inlet means and supplying said air from said outside air inlet means to said central chamber, outside air inlet damper means for adjustably controlling the inlet flow area through said outside air inlet means into said central chamber, return air inlet means for allowing air within said building interior to enter said enclosure central chamber, return air inlet damper means for adjustably controlling the inlet flow area through said return air inlet means into said central chamber, blower means mounted to said enclosure having an inlet communicating with said enclosure central chamber and an outlet for discharging air into said building interior, blower speed control means for adjustably controlling the volumetric output rate of said blower means, damper control means for controlling said outside air inlet damper means and said return air inlet damper means whereby the total airflow area defined by said outside air inlet damper means and said return air inlet damper means provides airflow velocity through said direct fire burner within a range determined to produce proper combustion through a range of settings of said volumetric output rates of said blower means, a plurality of pressure monitors distributed about said building, and a central controller receiving signals from said pressure monitors, said central controller controlling individual of said airhouses to operate at independently adjustably desired blower speeds to provide desired building pressurization levels throughout said building.

20. A building air environmental control system comprising:

a plurality of airhouses distributed about said building, each of said airhouses comprising, an enclosure defining an interior volume, heating means for heating air in said enclosure interior volume, outside air inlet means for allowing air from outside the interior of said building to enter said enclosure interior volume, outside air inlet damper means for adjustably controlling the inlet flow area through said outside air inlet means into said enclosure interior volume, return air inlet means for allowing air within said building interior to enter said enclosure interior volume, return air inlet damper means for adjustably controlling the inlet flow area though said return air inlet means into said enclosure interior volume, blower means mounted to said enclosure having an inlet communicating with said enclosure interior volume and an outlet for discharging air to said building interior, blower speed control means for adjustably controlling the volumetric output rate of said blower means, damper control means for controlling said outside air inlet damper means and said return air inlet damper means to maintain a desired total airflow area defined by said outside air inlet damper means and said return air inlet damper means, diffuser means for discharging air from said airhouse into said building interior, said diffuser means being adjustable to provide a variable discharge flow area, diffuser controller means for adjusting said diffuser means in response to changes in said blower volumetric output rate, a plurality of pressure monitors distributed about said building, and a central controller receiving signals from said pressure monitors, said central controller controlling individual of said airhouses to operate at independently adjustably desired blower speeds to provide desired building pressurization levels throughout said building.

* * * * *